United States Patent
Leijten (10) Patent No.: US 10,273,706 B2
(45) Date of Patent: Apr. 30, 2019

(54) TOWER SECTION FOR A TETHERED WIND TURBINE TOWER

(71) Applicant: Vestas Wind Systems A/S, Aarhus N. (DK)

(72) Inventor: Edgar Leijten, Århus C (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 15/758,075

(22) PCT Filed: Sep. 9, 2016

(86) PCT No.: PCT/DK2016/050296
§ 371 (c)(1),
(2) Date: Mar. 7, 2018

(87) PCT Pub. No.: WO2017/041806
PCT Pub. Date: Mar. 16, 2017

(65) Prior Publication Data
US 2018/0258664 A1    Sep. 13, 2018

(30) Foreign Application Priority Data

Sep. 11, 2015  (DK) ................................ 2015 70584

(51) Int. Cl.
*E04H 12/08* (2006.01)
*E04H 12/12* (2006.01)
(Continued)

(52) U.S. Cl.
CPC ............. *E04H 12/20* (2013.01); *E04H 12/08* (2013.01); *E04H 12/12* (2013.01); *F03D 13/20* (2016.05);
(Continued)

(58) Field of Classification Search
CPC ......... E04H 12/20; E04H 12/08; E04H 12/12; E04H 12/342; F03D 13/20; F05B 2240/917
See application file for complete search history.

(56) References Cited

U.S. PATENT DOCUMENTS

| 4,266,911 A | 5/1981 | Helm et al. |
| 9,617,752 B2 * | 4/2017 | Wagner ................... F03D 13/20 |
| 2015/0308139 A1 * | 10/2015 | Wagner ................... F03D 13/20 52/1 |

FOREIGN PATENT DOCUMENTS

| DE | 3339125 A1 | 5/1985 |
| WO | 2014033332 A1 | 3/2014 |

(Continued)

OTHER PUBLICATIONS

European Patent Office, International Search Report and Written Opinion in PCT Application No. PCT/DK2016/050296, dated Dec. 7, 2016.

(Continued)

*Primary Examiner* — Rodney Mintz
(74) *Attorney, Agent, or Firm* — Wood Herron & Evans LLP (57) ABSTRACT

The invention relates to a tower section (103) for a tethered wind turbine tower comprising a plurality of tubes (202) adapted for receiving a cable (205) there-through and fixing said cable at said inner tube end. The tower section may further include an inner stiffening ring (203) and/or an outer stiffening ring (204).

20 Claims, 4 Drawing Sheets

(51) Int. Cl.
  *E04H 12/20* (2006.01)
  *E04H 12/34* (2006.01)
  *F03D 13/20* (2016.01)
(52) U.S. Cl.
  CPC ...... *E04H 12/342* (2013.01); *F05B 2240/912* (2013.01); *F05B 2240/917* (2013.01); *Y02E 10/728* (2013.01)

(56) References Cited

FOREIGN PATENT DOCUMENTS

WO  2014068592 A1  5/2014
WO  2015110580 A1  7/2015

OTHER PUBLICATIONS

Danish Patent and Trademark Office, Search and Examination Report in PA 2015 70584, dated Apr. 29, 2016.

\* cited by examiner

TOWER SECTION FOR A TETHERED WIND TURBINE TOWER

FIELD OF THE INVENTION

The present invention relates to an interface module for a wind turbine tower wherein the tower is tethered by a number of cables extending between anchoring elements on anchor blocks and the interface module at the tower.

BACKGROUND OF THE INVENTION

A traditional tower for a wind turbine is a tubular steel tower with tower sections placed on top of each other fixed to a concrete foundation. Due to transport and production restrictions, the external diameter has a limited size. Therefore, often the shell thickness is seen as the primary dimensioning parameter when increasing the tower height.

Simply increasing the tower shell thickness is however a very ineffective way of achieving increased bearing capacity and stiffness as these parameters only grow linear with the shell thickness. In comparison, increasing the diameter of the tower yields an increased bearing capacity with the diameter in the power of two, and a stiffness growing with the diameter in three.

To overcome such size limitation problem different solutions have been used. For instance, the bearing capacity of a tower such as a wind turbine tower can be increased and the stresses reduced in parts of the tower by installing a number of cables or wires from a number of anchors or foundations to attachment points on the tower. The cables may provide stability to the tower to reduce oscillations from wind and may reduce the loads in the part of the tower below the cables considerably. This so-called guyed or tethered tower will to some extent be de-loaded by the wire reactions and may thereby potentially be constructed by fewer long sections with a relatively smaller and thereby more transportable diameters.

Typically the wires are equally spaced around the tower, with one of their ends being attached to the tower, via e.g. eyes in plates mounted to the tower, and the other ends to anchor blocks at ground level. In e.g. U.S. Pat. No. 4,266, 911 a separate ring is mounted around and movable along the tower and the wires may be mounted.

It is an object of the present invention to provide improvements to tethered wind turbine towers.

SUMMARY OF THE INVENTION

The invention relates to a tower section for a tethered tower, such as a tethered wind turbine tower. The tower section has a generally cylindrical wall and extends in a longitudinal direction along and about a central longitudinal axis from a lower end to an upper end of said tower section. The tower section comprises a plurality of tubes distributed around the central longitudinal axis, and each of the plurality of tubes has a generally cylindrical shape and extends through the cylindrical wall from an inner tube end on an inner side of the cylindrical wall to an outer tube end on an outer side of the cylindrical wall. Further, each of the plurality of tubes has a tube center line, and each of the plurality of tubes is adapted for receiving a cable therethrough and fixing the cable at the inner tube end.

With the present invention, a solution has been found, in which the tubes are used to transfer the cable loads to the other parts of the interface module in a very advantageous way. A temporary additional load, e.g. due to a harsh wind from a certain wind direction, will be distributed in a very organized way in the tower section due to the tubes. This may be improved even more through the insertion of the stiffening ring(s) to assist in distributing the loads. Further, it may be possible to improve this even more to avoid deformation due to increased stress levels around the interface between the tubes and the tower section wall by adjusting the cable center line relative to said tube center line.

In an embodiment of the invention the tower section is a cast structure.

In an embodiment of the invention the tower section is a welded structure.

In an embodiment of the invention the tower section is a combination of a cast and welded structure.

In an embodiment, where the tower section is a cast structure, the tubes are cast into the structure.

In an embodiment, where the tower section is a welded structure, the tubes are attached to the structure by welding.

In an embodiment, where the tower section is a welded structure, the tubes can be either cast into the structure or attached to the structure by welding.

In embodiments of the invention, the stiffening ring(s) may be an inner stiffening ring and/or an outer stiffening ring. An inner stiffening ring may be used to support a platform for easy access to the inner tube end and/or other purposes. In embodiments of the invention, an outer stiffening ring may have the shape of a conical frustum, by which extra good stiffening may be obtained as the direction may be aligned with the cables. Further, in other embodiments, extra good stiffening may be obtained when the outer stiffening ring connects to the sides of the tubes.

In an embodiment of the invention the inner stiffening ring and/or the outer stiffening ring is plate shaped, i.e. a thin flat piece of metal. The plate can be formed into a conical frustum or an annulus to fit the tower section.

The invention furthermore relates to a wind turbine comprising a tower section as described above and at least two further tower sections, which may be standard tower sections. Hereby, e.g. compared to using a separate external ring as in U.S. Pat. No. 4,266,911, it may furthermore be possible to reduce the overall use of material by integrating the cable connection into a tower section.

BRIEF DESCRIPTION OF THE FIGURES

In the following different embodiments of the invention will be described with reference to the drawings, wherein.

DETAILED DISCLOSURE OF THE INVENTION

For a tethered wind turbine, the tensioning and the attachments of the cables are crucial for the wind turbine tower to withstand the varying and potentially high wind forces which in the interaction with the rotor creates complex and at times quite extreme dynamic loads.

When herein the term 'anchor plate' is used, this is a term known to the skilled person; an anchor plate being used to fix the end of the cable. Further, an anchor plate to be used for multi-strand cables may be a plate with a plurality of holes, each of which enables individual strands to pass through and become individually tightened.

The cables may each be single element cables or mooring lines, tie rods, and/or each comprise a number of wires such as multi strand type wires consisting of a number of strands each consisting of a number of wires, where the wires can be arranged in parallel side by side, bonded, twisted, or braided or combinations hereof. When herein reference is given to a 'cable' in the meaning of a multi-strand cable system, it is under the interpretation that the multi-strand cable system after installation for all practical reasons can be considered as one single cable, and the individual strands makes only a difference during the installation process where the individual tightening discloses a number of advantages, as will be known by the skilled person in the art. Further hereto, when herein discussing a 'cable center line' for a multi-strand cable, this will be the line indicating the geometrical center of the cable. This means that even though a multi-strand cable typically for fastening the individual strands will be divided into separate strands just before the anchor plate, thereby obtaining a larger diameter of the cable as such, as the forces will be taken up equally in the individual strands, the cable center line will still be well-defined.

The cables may be made of steel and/or other materials such as Kevlar®. The anchor block could be placed on or into the ground or seabed, or could alternatively be attached to or form a part of another construction such as floating platform, depth anchors, or another tower foundation etc.

A cable may be anchored solely at the anchoring element and at the interface module or may be supported or attached in one or more points along its length for example by connection to other cables or stiffeners.

The tower may comprise one or more tower sections joined to each other before or after being positioned on top of each other or both. The tower may typically form a generally cylindrical tower wall. The tower may be made at least partly of steel and/or concrete, and may be reinforced in places by other or additional materials. In a preferred embodiment, the tower section is a steel construction. The tower may be self-supporting both with and without the cables attached. The tower may alternatively be self-supporting only with the cables attached and tensioned. In such case the tower may be temporarily stiffened or supported by a temporary support during erection until the cables are attached.

Figure 1:
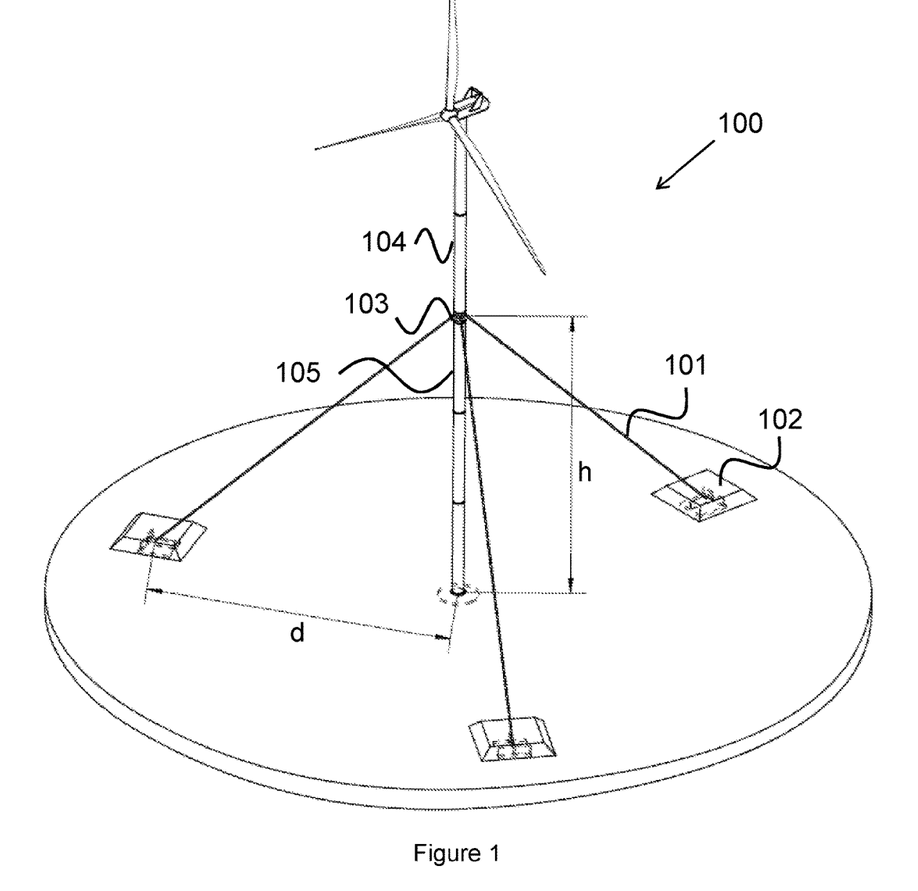
FIG. 1 shows a tethered wind turbine.

FIG. 1 shows a sketch of a wind turbine tower 100, in the top of which is supported a wind turbine nacelle and a rotor. A number of cables, 101, tethers the tower. The tower extends in a longitudinal direction along and about a central vertical longitudinal axis. In general, each cable 101 extends between a first cable end attached to an interface module 103 on the tower and a second cable end attached to an anchoring element 102. In the present embodiment shown in the figure, three different cables 101 extend between their first cable ends attached to the interface module 103 between an upper tower section 104 and a lower tower section 105 of the tower and their second cable ends attached to in total three different anchoring elements 102 which here are on the ground. Here, depicted in a perfectly flat terrain, the anchoring elements 102 are placed at the same distance from the tower and at 120° apart around the tower so that the cables tensioning is symmetrical. The cables here extend to the tower at an angle of approximately 45° and are attached to the tower at a height just beneath the height of wind turbine blade tip when in its lowermost position. In this way the cables cannot under any weather conditions be hit by a blade. In general, three cables are preferred but alternative numbers may also be applied. Further, different heights on the tower and different angles may come into play, and indeed different lengths of the cables due to non-flat terrain. In FIG. 1, the height from ground to the center of the interface module 103 is indicated as 'h', and the distance from the tower center to the entrance points of the cables into the anchoring element 102 is indicated as 'd'. Clearly, in flat terrain d and h will be substantially equal for a cable angle of approximately 45°; however, in non-flat terrain, d may cover different values for each cable, $d_1$, $d_2$, $d_3$, where none are necessarily close to h.

As indicated the tower is made up of a number of tubular tower sections. In the shown embodiment, the interface module 103 works as a separate tower section positioned between an upper tower section 104 and a lower tower section 105. A close-up of this interface module can be seen in FIG. 2, where the cable connection points are placed in a very short tower section, the interface module 103, mounted in between standard tower sections. However the structure with cable connection points can also be integrated in a standard tower section, which will save the cost of a flange connection. Consequently, in one embodiment, the tower section has a longitudinal length of at least half of the average of the upper tower section and the lower tower section, such as substantially the same length as the other tower sections. In another embodiment being a short module, the tower section has a longitudinal length of less than twice the size of the diameter of the cylindrical wall.

Figure 2:
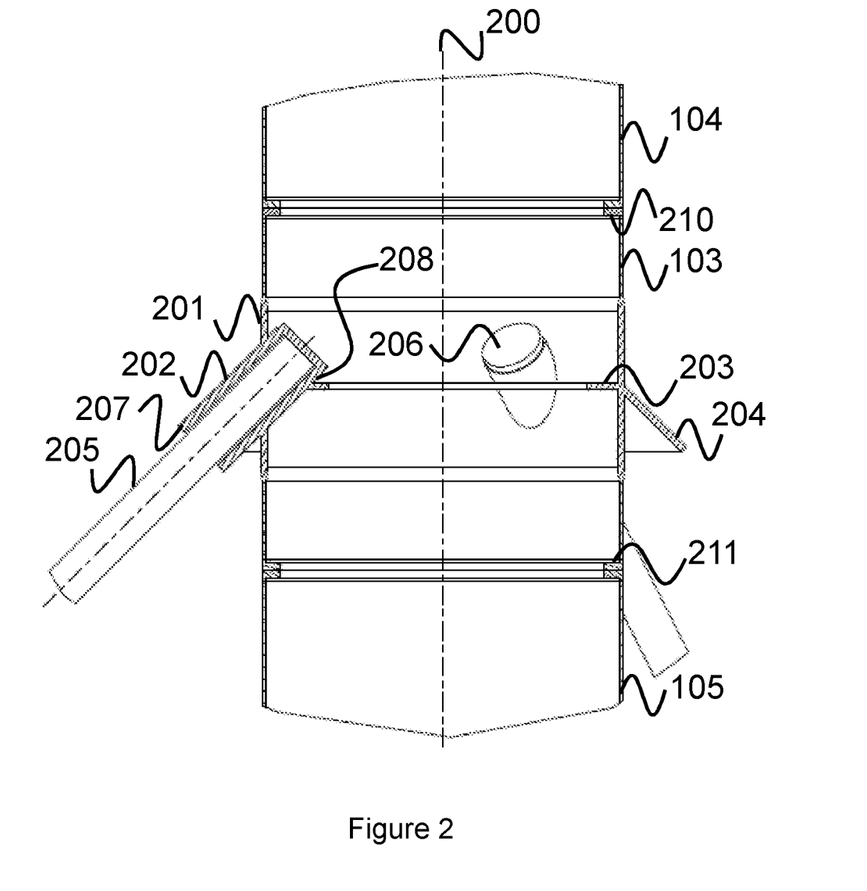
FIG. 2 shows an interface module according to an embodiment of the invention.

The structure that forms the connection point of the cables/guy wires to the tower may comprise a thick sheet 201, a tube 202 for each cable 205, an inner stiffening ring 203 and an outer stiffening ring 204. The thick sheet has the same cross-sectional outline as the remaining part of the tower—in this case circular—and is connected to the remaining part of the tower via the upper 210 and lower 211 flanges. This means that in this embodiment, said upper end and said lower end comprises attachment flanges 210, 211 for connection to further tower sections 104, 105. As an alternative to the thick sheet, the structure may comprise another additional reinforcement compared to its neighboring tower sections by having higher strength and/or stiffness.

The cables are attached at the same height and at even intervals around the intermediate module to thereby distribute the forces from the cables evenly and facilitating that the cables can be attached to one interface module. In further embodiments, the tower may be tethered by more cables or more sets of cables attached at different heights of the tower.

Figure 3:
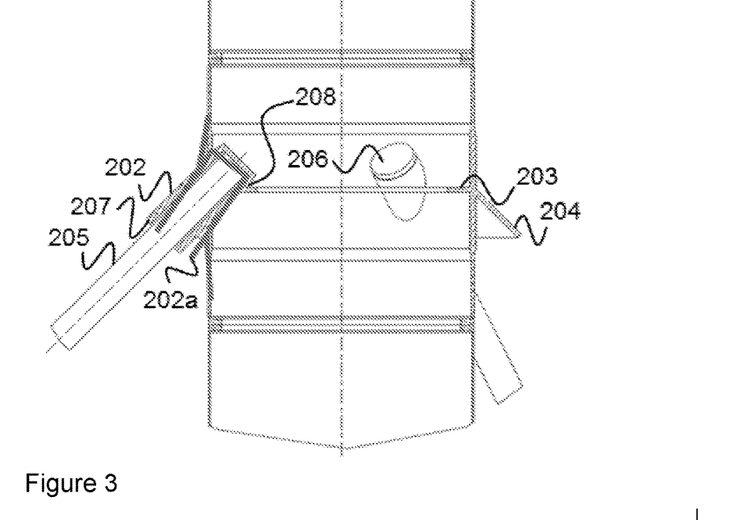
FIG. 3 shows a deformed interface module.

In FIGS. 2 and 3, for sake of simplicity, the cable 205 is illustrated as a circular single cable filling out the full internal of the tube, wherein each cable 205 is fed into its individual tube 202 and is attached to an anchor plate 206 at the inner tube end 208. However, in reality different solutions may be used of which the full internal of the tube will not be completely full. In a preferred embodiment, a multi-strand cable system which is supported by an anchor plate 206 is used, but in alternative embodiments, other cable and/or anchoring systems (e.g. clevis) could also be used with a similar interface module structural design. In a typical situation, e.g. for a multi-strand cable system, the tubes may have a diameter of 450 mm (17.72 inches) and the cable a diameter of 125 mm (4.92 inches). In such a situation, the cable fills up only about 8% of the internal volume of the tube.

According to various embodiments, the tubes may have a diameter between 300 mm (11.81 inches) and 600 mm (23.62 inches), such as between 400 mm (15.75 inches) and 500 mm (19.69 inches). According to various embodiments, the cables may have a diameter between 50 mm (1.97 inches) and 300 mm (11.81 inches), such as between 100 mm (3.94 inches) and 150 mm (5.91 inches). According to various embodiments, the cable fills up between 4% and 40% of the internal volume of the tube, such as between 6% and 20%.

The tubes 202 are used to guide the cables into the tower, support the anchor plate 206 and transfer the cable loads to the other parts of the interface module. The outer tube ends 207 can also be used for mounting standard cable recess pipes or cable sheathing, in order to protect the cable ends from the weather.

The outside ring 204 connects to the sides of the tubes and to the thick sheet 201. The outside ring has the shape of a conical frustum and, like the tubes, is in one embodiment placed at the same angle as the cable. The outside ring provides stiffness and distributes a share of the loads from the tower to the cable tubes and vice-versa.

The inside ring 203 connects to the inside of the structure, at approximately the height where the outside ring is attached. The inside ring is shown as horizontal and stiffens the structure. In further embodiments, the inside ring could be placed in other angles, such as also a conical frustum (basically as an extension of the outside ring). The inside ring can be designed such that it, or part of it, can be used to support a platform to access the cable ends at the inner tube end.

With this design the cable ends can be accessed from inside the tower, for example for installation, post-tensioning and maintenance. This has advantages for the installation procedure, operation and maintenance, including replacement of individual strands, and the cable ends and connection point are quite protected from the weather. The design is relatively compact for transportation, while still providing space inside for tower internals. Placing required stiffening only outside may be problematic for transport as the size may turn too big. Placing required stiffening only inside may be problematic as it will make the passage hole inside very small and it may be problematic for personnel and material to pass through. Therefore, it is believed that for most embodiments, the most preferable solution is to have stiffening, such as stiffening rings, both on the inside and the outside.

The structure is designed such that loads transferred from/to the cables are distributed in the structure as much as possible, which keeps stresses fairly low. Furthermore the structure provides stiffness to minimise local deformations, which helps to minimise deformations of adjacent tower flanges or tower shells.

As mentioned above, in a first embodiment the angle of the cable 205 is identical to the angle of the supporting structure (tube 202 and outside stiffener 203). During analysis it has been found that the supporting structure may deflect due to cable loading, and thereby may be tilted downwards (indicated in FIG. 3 sketch below, exaggerated deformation for illustrative reasons. The deflected tube indicated with 202a). Even though the deflections are limited it leads to some local increased stress levels around the cable tubes.

Figure 4:
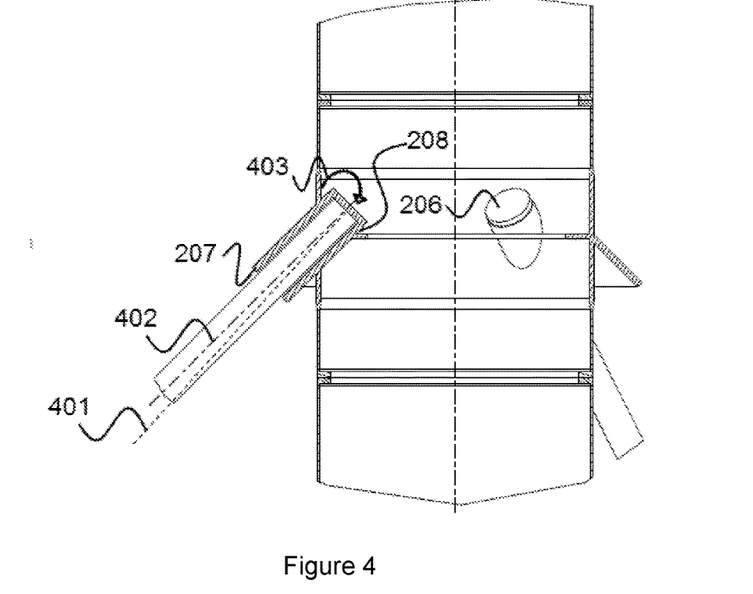
FIGS. 4 and 5 show interface modules according to embodiments of the invention.

Therefore, FIG. 4 discloses that according to embodiments of the interface module, a deliberate introduction of a misalignment between the cable (cable center line indicated with 401) and the tubes (tube center line indicated with 402) is introduced. Hereby the cable loads induce a local bending moment 403 which counteracts some or most of the tilting deflection observed in the design without misalignment. The counteraction leads to a significant reduction in stresses in the region around the tubes. It is believed that this can provide a stress reduction of up to 25% stress reduction in the highest stressed areas. Implementing the misalignment could therefore result in a lower material usage (lower thicknesses of plates) and thus a weight and cost reduction.

An optimum misalignment is yet to be decided, but e.g. at 5° a significant effect has been seen. It is therefore expected to see an improvement with misalignment angles in the range of 1 to 20°, such as 2 to 10° or 3 to 8°. It is believed that such a deliberate misalignment should preferably be downwards relative to the tubes such that the cable center line, the tube center line and the central longitudinal axis 200 are all in substantially the same plane.

In FIG. 4, the cable is put in a misalignment angle compared to 45°; however, according to other embodiments the predefined cable angle is maintained and the misalignment angle is incorporated into the structural design.

Figure 5:
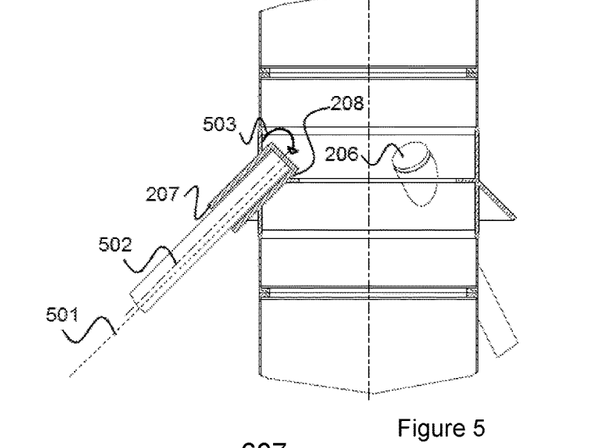

Another possibility as shown in FIG. 5 is to achieve the same effect by placing the cable eccentric in the tube of the supporting structure. The cable center line 501 and the tube center line 502 are hereby parallel but with a distance in between. This distance could e.g. be at least 2% of the tube radius, such as at least 5%, 10%, 20% or at least 30%, as measured at least at the inner tube end 208. Similar to an angular misalignment this results in a bending moment 503 which counteracts some or most of the tilting deflection observed in the design without misalignment. It should be clear that the angular misalignment and the eccentric misalignment may be used in combination.

The deliberate eccentric misalignment may be obtained in a number of ways well-known to the skilled person in the art.

The deliberate angular misalignment may be obtained in a number of ways according to embodiments of the present invention.

For instance the deliberate eccentric misalignment may be obtained simply by placing the anchor plate 206 off-set in relation to the inner tube end 208. This can be done in a number of ways as it simply spoken is a question of how the anchor plate is designed/placed in relation to the tube. The important issue simply being to introduce a deliberate eccentric misalignment.

Further the deliberate angular misalignment may e.g. be obtained by adjusting the inner tube end 208, such that a standard flat anchor plate lying against the inner tube end 208 is not perpendicular on the tube center line.

In the following, two methods are described which may be used to deal with undeliberate misalignments on the cable foundation side and/or on the tower side, for example to compensate for tolerances or inaccuracies during installation. If in such a situation the cable would be attached directly to the tower and foundation, the misalignment would introduce unfavorable inclinations and stresses within the cable system. It is noted, however, that these two methods may also be used to obtain a deliberate angular misalignment as discussed above.

Figure 6:
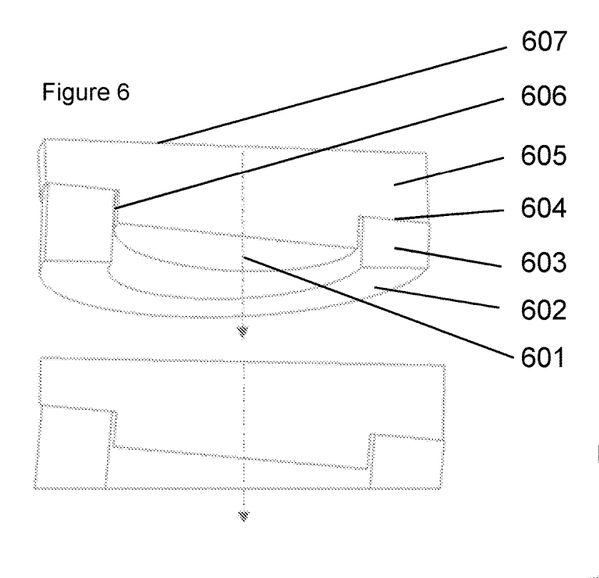
FIGS. 6 and 7 show anchor plate systems according to embodiments of the invention.

In a first embodiment the system comprises an adjustable anchor plate system for a multi-strand cable system as shown in FIG. 6. The anchor plate system consists of two components, a ring 603 which is mounted to the supporting structure on the bottom surface 602, and the anchor plate 605 to which the cable strands are mounted with a standard wedge system. The wedges and cable strand ends are oriented perpendicular to the top surface 607 of the anchor plate. An edge 606 keeps the two components centered.

The interface surface 604 between the two components is placed at an angle. Tilting of the top surface 607 in two directions can be achieved by rotating the anchor plate or by rotating the assembly. Through these rotations it is possible to achieve a cable center line 601 as desired within a range as defined by the angle between the two components. Hereby this may be used to align the cable center line with the tube direction or deliberately introduce a desired misalignment to lower the stress levels around the cable tubes as explained above.

According to various embodiments, the system may facilitate that a rotation of said anchor plate relative to said ring may result in angles of said cable center line relative to said bottom surface of between 0.1° and 15°, such as between 1° and 10°.

Figure 7:
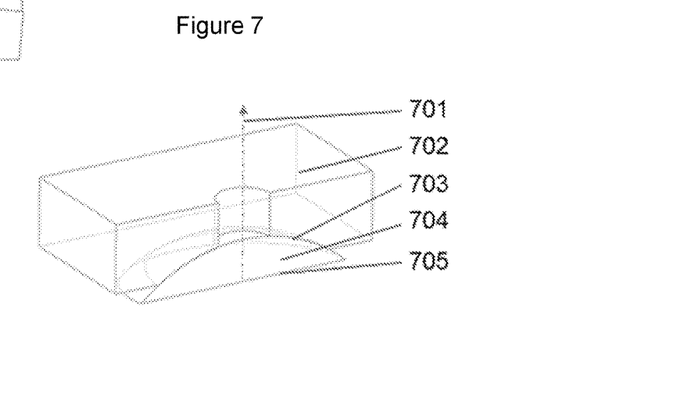

In a second embodiment the system is as shown in FIG. 7, based on spherical surfaces 703. This system consists of two parts, an anchor plate part 704 with a convex spherical surface and a supporting plate 702 with a concave spherical surface. The supporting plate is fixed to a support structure. The cable strands 701 come in through opening(s) in the supporting plate 702 and are attached to the convex anchor plate component 704. The wedges and cable strand ends are oriented perpendicular to the top surface 705 of the anchor plate part. According to various embodiments, the system may facilitate that a movement of said anchor plate relative to said supporting plate may result in angles of said cable center line relative to said supporting plate of between 0.1° and 15°, such as between 1° and 10°.

Both spherical surfaces have at least approximately the same radius. The convex component can be tilted in the desired direction in order to obtain a cable center line which is as straight as possible. After post-tensioning the cables, the component will be kept in place by means of friction and the tilting angle will not change anymore. In addition to that the concave shape of the supporting plate 702 ensures the stability of the alignment system, as the cable tension will keep the convex plate perpendicular to the cable even when friction would be gone.

In a typical situation, without external load on the wind turbine, each cable may be pre-tensioned to a value in the interval of 30-55% of their nominal strength, such as in the interval of 40-50% of their nominal strength.

Both of the solutions shown in FIGS. 6 and 7 may be used in both the cable end side and the foundation side. It is believed that most preferred is that an adjustable anchor plate is used on the tower end of the cable, and for the spherical method to be applied on the foundation side. However, other combinations are possible as well.

Further it is noted that due to terrain variations or the like, it may be necessary to place the anchors a bit off-set from 120° around the tower. In that case it may be advantageous as well to have a system capable of adjustment accordingly.

According to additional embodiments of the present invention, a standard anchor plate may be used, well-known to the skilled person, in which angles of the cable center line cannot be adjusted.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

The invention claimed is:

1. A tower section for a tethered tower, said tower section having a cylindrical wall and extending in a longitudinal direction along and about a central longitudinal axis from a lower end to an upper end of said tower section, said tower section comprising:
   a plurality of tubes distributed around said central longitudinal axis,
   wherein each of said plurality of tubes includes an inner tube portion with an inner tube end on an inner side of said cylindrical wall, an outer tube portion with an outer tube end on an outer side of said cylindrical wall, and a passageway extending from the inner tube end to the outer tube end through said cylindrical wall,
   wherein each of said plurality of tubes has a tube center line, and
   wherein each of said plurality of tubes is adapted for receiving a cable there-through and fixing said cable at said inner tube end.

2. The tower section according to claim 1, wherein the tower section is a cast structure and the plurality of tubes are cast with the cylindrical wall.

3. The tower section according to claim 1, wherein the tower section is a welded structure and the plurality of tubes are welded to the cylindrical wall.

4. The tower section according to claim 1, wherein each of the plurality of tubes defines a tube wall extending from the inner tube end to the outer tube end, and wherein the tube wall extends through the cylindrical wall of the tower section.

5. The tower section according to claim 1, wherein said tower section comprises at least one of an inner stiffening ring and an outer stiffening ring.

6. The tower section according to claim 5, wherein said inner stiffening ring is positioned along the inner side of the cylindrical wall in a single plane perpendicular to said central longitudinal axis.

7. The tower section according to claim 5, wherein said inner stiffening ring connects to an inside of the tower section at a height where the tube center line of each of said plurality of tubes crosses said cylindrical wall.

8. The tower section according to claim 5, wherein said outer stiffening ring has the shape of a conical frustum.

9. A tower section for a tethered tower, said tower section having a cylindrical wall and extending in a longitudinal direction along and about a central longitudinal axis from a lower end to an upper end of said tower section, said tower section comprising:
   a plurality of tubes distributed around said central longitudinal axis,
   each of said plurality of tubes having a cylindrical shape and extending through said cylindrical wall from an inner tube end on an inner side of said cylindrical wall to an outer tube end on an outer side of said cylindrical wall,
   each of said plurality of tubes having a tube center line, and
   each of said plurality of tubes being adapted for receiving a cable there-through and fixing said cable at said inner tube end.

10. The tower section according to claim 9, wherein said tube center line of each of said plurality of tubes and said central longitudinal axis has a mutual angle of between 30 and 60°.

11. The tower section according to claim 9, wherein said cylindrical wall has at least two different thicknesses; a thinner thickness closest to said lower end of said tower section and said upper end of said tower section and a thicker thickness of the cylindrical wall around said plurality of tubes.

12. The tower section according to claim 11, wherein said thicker thickness is at least 25% bigger than said thinner thickness.

13. The tower section according to claim 9, wherein said tower section comprises at least one of an inner stiffening ring and an outer stiffening ring.

14. The tower section according to claim 13, wherein said inner stiffening ring is positioned along the inner side of the cylindrical wall in a single plane perpendicular to said central longitudinal axis.

15. The tower section according to claim 13, wherein said inner stiffening ring is adapted to support a platform to provide access to the inner tube end.

16. The tower section according to claim 13, wherein said outer stiffening ring has the shape of a conical frustum.

17. The tower section according to claim 13, wherein said outer stiffening ring connects to sides of the plurality of tubes.

18. The tower section according to claim 13, wherein said inner stiffening ring connects to an inside of the tower section at a height where the tube center line of each of said plurality of tubes crosses said cylindrical wall.

19. The tower section according to claim 13, wherein an angle between said central longitudinal axis and said tube center line of each of said plurality of tubes is substantially the same as an angle between said central longitudinal axis and said outer stiffening ring.

20. A wind turbine comprising the tower section according to claim 9 and at least two further tower sections, wherein said tower section is coupled to said at least two further tower sections on said lower end and said upper end, respectively, of said tower section.

* * * * *